(12) United States Patent
 Pagis

(10) Patent No.: US 12,544,319 B2
(45) Date of Patent: Feb. 10, 2026

(54) USE OF CALCINED KAOLIN AS A MATTIFYING AGENT

(71) Applicant: IMERTECH SAS, Paris (FR)

(72) Inventor: Laure Pagis, Toulouse (FR)

(73) Assignee: IMERTECH SAS, Paris (FR)

(*) Notice: Subject to any disclaimer, the term of this patent is extended or adjusted under 35 U.S.C. 154(b) by 0 days.

(21) Appl. No.: 16/754,890

(22) PCT Filed: Oct. 9, 2018

(86) PCT No.: PCT/EP2018/077520
§ 371 (c)(1),
(2) Date: Apr. 9, 2020

(87) PCT Pub. No.: WO2019/072874
PCT Pub. Date: Apr. 18, 2019

(65) Prior Publication Data
US 2020/0289385 A1    Sep. 17, 2020

(30) Foreign Application Priority Data

Oct. 10, 2017  (FR) .................................. 17306362.9

(51) Int. Cl.
| A61K 8/26 | (2006.01) |
| A61K 8/02 | (2006.01) |
| A61Q 1/02 | (2006.01) |
| C09C 1/42 | (2006.01) |

(52) U.S. Cl.
CPC ............... *A61K 8/26* (2013.01); *A61K 8/022* (2013.01); *A61Q 1/02* (2013.01); *C09C 1/42* (2013.01)

(58) Field of Classification Search
None
See application file for complete search history.

(56) References Cited

U.S. PATENT DOCUMENTS

| 4,980,157 A * | 12/1990 | Mercado .................. A61K 8/26 |
| | | 424/69 |
| 5,030,445 A | 7/1991 | Hashimoto et al. |
| 5,658,579 A * | 8/1997 | LaFleur .................... A61K 8/25 |
| | | 424/401 |
| 6,136,740 A | 10/2000 | Jones et al. |
| 6,334,894 B1 * | 1/2002 | Kostuch .................. C09D 7/68 |
| | | 501/145 |

(Continued)

FOREIGN PATENT DOCUMENTS

| EP | 0060088 | 9/1982 |
| EP | 0102695 | 3/1984 |

(Continued)

OTHER PUBLICATIONS

China Clay. Published: Jun. 2007.*

(Continued)

*Primary Examiner* — Nicole P Babson
*Assistant Examiner* — Lori K Mattison
(74) *Attorney, Agent, or Firm* — Finnegan, Henderson, Farabow, Garrett & Dunner, LLP

(57) ABSTRACT

A cosmetic composition comprising a cosmetically acceptable carrier and at least 2.5% by weight of calcined kaolin relative to the total weight of the composition, a cosmetic method for reducing the gloss of the skin, and the use of calcined kaolin as a mattifying agent in a cosmetic composition.

4 Claims, 1 Drawing Sheet

% volunteers that present a mattifying effect

(56) References Cited

U.S. PATENT DOCUMENTS

| | | | |
|---|---|---|---|
| 2004/0120913 A1* | 6/2004 | Shah | A61K 8/553 424/70.12 |
| 2012/0058165 A1 | 3/2012 | Klofta et al. | |
| 2019/0110964 A1* | 4/2019 | Pagis | A61Q 5/00 |

FOREIGN PATENT DOCUMENTS

| | | | | |
|---|---|---|---|---|
| EP | 0 799 021 B1 | | 10/1997 | |
| EP | 1 106 164 A1 | | 5/2014 | |
| JP | 57-169412 A | | 10/1982 | |
| JP | S57169412 | | 10/1982 | |
| JP | 61-207314 | | 9/1986 | |
| JP | 61-210019 | | 9/1986 | |
| JP | H05194174 | * | 8/1993 | A61K 7/48 |
| JP | 2000169122 A | | 6/2000 | |
| JP | 2004240361 | * | 9/2004 | A61K 7/00 |
| JP | 2010-280642 | | 12/2010 | |
| JP | 2017114819 A | | 6/2017 | |
| JP | 2017-178854 | | 10/2017 | |
| WO | WO 96/17588 | | 6/1996 | |
| WO | WO 99/24360 | | 5/1999 | |
| WO | 2004085336 A2 | | 10/2004 | |
| WO | WO 2004/085336 | | 10/2004 | |
| WO | WO-2006081333 A2 | * | 8/2006 | C04B 38/0006 |
| WO | 2013160362 A1 | | 10/2013 | |
| WO | WO 2013/160362 | | 10/2013 | |
| WO | WO2016055518 | * | 4/2016 | A61K 8/02 |
| WO | WO-2016146708 A1 | * | 9/2016 | A61K 8/02 |
| WO | WO 2017/174756 | | 12/2017 | |

OTHER PUBLICATIONS

JPS57169412A Eng Tran.*
Read the Label. https://promakeupstore.wordpress.com/2012/05/22/read-the-label-ben-nye-matte-hd-foundation-vs-ben-nye-media-pro-blue-neutralizer/. Published: May 22, 2012.*
Godet. http://www.harjeepackaging.com/aluminium-godets-cosmetic-cases-1116204.html. Published Mar. 13, 2011.*
Ben Nye. https://tanimaralayla.com/2012/06/03/ben-nye-matte-hd-foundation-and-media-pro-concealer/. Published: Jun. 3, 2012.*
Güneyisi. Canadian Journal of Civil Engineering. p. 1274-1283. Published: Dec. 2012.*
JP2004250361 Eng. Tran. Published: Sep. 9, 2004.*
JPH05194174 Eng Tran. Published: Aug. 3, 1993.*
Bulk Naturals. https://www.bulknaturalswholesale.com/products/high-purity-white-kaolin-clay-wholesale-samples-1-2-1-2-3-4-6-8-12-15-16oz-1-2-3-4-5lbs. Published: Dec. 15, 2016.*
Revea. https://www.myrevea.com/ingredient-explorer/styrene-acrylates-copolymer/. Published: 2024.*
International Search Report and Written Opinion issued Dec. 12, 2018, in International Application No. PCT/EP2018/077520 (15 pgs.).

* cited by examiner

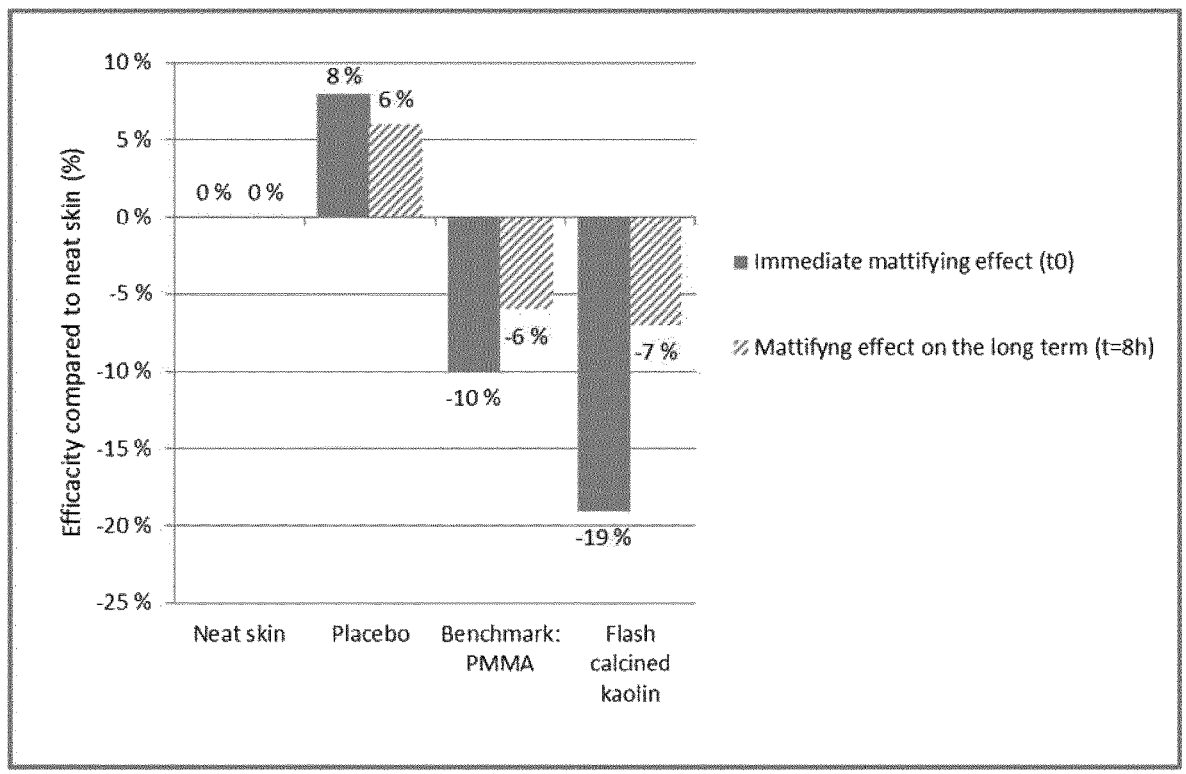
Fig. 1: Variation of skin gloss
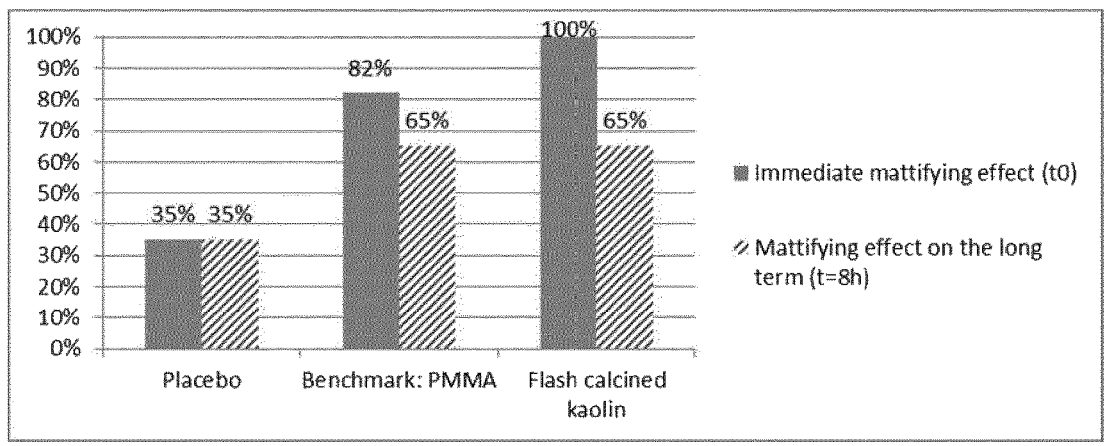
Fig. 2: % volunteers that present a mattifying effect

USE OF CALCINED KAOLIN AS A MATTIFYING AGENT

CLAIM FOR PRIORITY

This application is a U.S. national phase entry under 35 U.S.C. § 371 from PCT International Application No. PCT/EP2018/077520, filed Oct. 9, 2018 which claims the benefit of priority of European Patent Application No. 17306362.9, filed Oct. 10, 2017, from which this application claims priority and all of which are incorporated herein by reference.

TECHNICAL FIELD

The present invention generally relates to the use of calcined kaolin as a mattifying agent, in particular the use of calcined kaolin as a mattifying agent in cosmetic compositions. Thus, the present invention relates to a cosmetic composition comprising a cosmetically acceptable carrier and calcined kaolin and the use of said compositions. In particular embodiments, the cosmetic composition is a liquid cosmetic composition. In particular embodiments, the kaolin replaces some or all of another mattifying agent in the cosmetic composition.

BACKGROUND

Shiny skin, generally associated with a substantial secretion of sebum, is a problem essentially affecting adolescents, but which may also appear in adulthood as a result especially of an overproduction of androgens, or as a result of external factors such as pollution. Shiny skin may also be associated with sweat resulting from physical activity or weather conditions. Shiny skin may be due to the combination of both these phenomena (sebum and sweat). Obtaining a matt effect on the skin is highly desired by users who have combination or oily skin, and also for cosmetic compositions that are intended to be used in hot and humid climates. The reflections caused by excess sebum or sweat on the surface of the skin are considered unattractive. Shiny skin also generally gives rise to poorer makeup staying power, which thus has a tendency to become degraded in the course of the day.

An effective means of quickly reducing areas of unattractive shine consists in using fillers that absorb sebum and perspiration. PMMA powder and nylon powder are well known for having a mattifying effect. However, these mattifying agents are derived from oil, which renders them unappealing for costumers and are not eco-friendly.

There was a need to find an efficient and non-synthetic mattifying agent.

The Applicant has discovered that this need could be met by a composition comprising a cosmetic composition comprising a cosmetically acceptable carrier and at least 2.5% by weight of calcined kaolin relative to the total weight of the composition.

The use of natural kaolin in cosmetics composition was already disclosed, for example in EP 0 7999 021 or in EP 1 106 164.

But the Applicant found that, contrary to natural kaolin which does not provide mattifying effect, calcined kaolin had unexpectedly a high mattifying effect.

The composition thus obtained makes it possible to improve skin mattness in a lasting manner. The skin is thus rendered matt in a long-lasting manner.

SUMMARY

In accordance with a first aspect of the present invention, there is provided a cosmetic composition comprising a cosmetically acceptable carrier and at least 2.5% by weight of calcined kaolin relative to the total weight of the composition.

For example, the cosmetic composition comprises a cosmetically acceptable carrier and at least 3% by weight of calcined kaolin, for example at least 3.5% by weight of calcined kaolin, for example at least 4% by weight of calcined kaolin relative to the total weight of the composition.

In certain embodiments of any aspect of the present invention, the calcined kaolin is flash calcined kaolin.

In certain embodiments of any aspect of the present invention, the cosmetic composition does not contain any oil-derived mattifying agent.

In certain embodiments of any aspect of the present invention, the cosmetic composition does not contain any nanoparticles.

In certain embodiments of any aspect of the invention, the calcined kaolin is uncoated.

In certain embodiments of any aspect of the invention, the calcined kaolin is not coated by an oil-derived component such as an oil-derived mattifying agent and/or by nanoparticles.

In certain embodiments of any aspect of the present invention, the cosmetic composition does not contain any mattifying agent different from calcined kaolin.

In certain embodiments of any aspect of the present invention, the cosmetic composition further contains a mattifying agent different from calcined kaolin.

In certain embodiments of any aspect of the present invention, the cosmetic composition comprises less than about 0.5 wt %, for example equal to or less than about 0.4 wt %, for example equal to or less than about 0.2 wt % of a mattifying agent different from calcined kaolin.

In certain embodiments of any aspect of the present invention, the calcined kaolin has an oil absorption capacity of at least 60 mL/100 g of calcined kaolin, preferably of at least 80 mL/100 g of calcined kaolin.

In certain embodiments of any aspect of the present invention, the cosmetic composition is a powder cosmetic composition, for example a pressed powder cosmetic composition.

In certain embodiments of any aspect of the present invention, the cosmetic composition is a liquid cosmetic composition, for example a gel cosmetic composition or a cream cosmetic composition.

In certain embodiments of any aspect of the present invention, the cosmetic composition contains equal to or less than 30% by weight of calcined kaolin, alternatively, between 5 and 20% by weight of calcined kaolin, relative to the total weight of the composition.

In certain embodiments of any aspect of the present invention, the cosmetic composition contains equal to or less than 15% by weight of calcined kaolin, alternatively, equal to or less than 7% by weight of calcined kaolin, relative to the total weight of the composition.

In certain embodiments of any aspect of the present invention, the calcined kaolin has a $d_{50}$ ranging from about 0.1 to 4.0 µm, for example 0.8 to about 1.8 µm.

In certain embodiments of any aspect of the present invention, the cosmetic composition is a non-rinsed cosmetic composition.

In a second aspect of the present invention, there is provided a cosmetic composition comprising a cosmetically acceptable carrier and flash calcined kaolin.

In a third aspect of the present invention, there is provided a cosmetic composition comprising a cosmetically acceptable carrier; calcined kaolin; and a mattifying agent different from calcined kaolin.

In a fourth aspect of the present invention, there is provided a non-rinsed cosmetic composition comprising a cosmetically acceptable carrier and calcined kaolin.

In a fifth aspect of the present invention, there is provided a cosmetic method for reducing the gloss of the skin, consisting in applying to the surface of the skin an effective amount of calcined kaolin as defined in any preceding aspects of the invention.

In a sixth aspect of the present invention there is provided a use of calcined kaolin as a mattifying agent in a cosmetic composition.

The present invention provides the advantage compared, for example, to mattifying agent currently used in cosmetic compositions, of being environmentally friendly while having a satisfying mattifying effect.

The details, examples and preferences provided in relation to any particular one or more of the stated aspects of the present invention apply equally to all aspects of the present invention. Any combination of the embodiments, examples and preferences described herein in all possible variations thereof is encompassed by the present invention unless otherwise indicated herein, or otherwise clearly contradicted by context.

BRIEF DESCRIPTION OF THE FIGURES

The invention may be described, without limitation, in relation to the following examples and Figure, in which:

FIG. 1 shows the immediate and long term mattifying efficacity of the various compositions prepared in Example 1 compared to neat skin.

FIG. 2 shows the percentage of volunteers showing an immediate or long term mattifying effect with the various compositions prepared in Example 1.

DETAILED DESCRIPTION

Cosmetic Compositions

A cosmetic composition comprising a cosmetically acceptable carrier and calcined kaolin is disclosed herein. It has surprisingly and advantageously been found that calcined kaolin can be used as a mattifying agent in cosmetic compositions. Thus, calcined kaolin may be used to replace mattifying agent such as oil-derived mattifying agents, like PMMA or nylon powders, which are currently used in cosmetic compositions. In particular, it has surprisingly and advantageously been found that calcined kaolin is stable in cosmetic compositions, in particular at low pHs and in the presence of ionic substances such as cationic conditioning agents. In particular, it has surprisingly and advantageously been found that kaolin can be used in similar quantities to currently used mattifying agent to provide comparable or better properties such as mattifying effect (including a comparative or better oil absorption, sebum absorption and water absorption), opacity, softness and smoothness.

The cosmetic compositions may therefore comprise no oil-derived mattifying agent.

The term "oil-derived mattifying agent" relates to any ingredient known as a mattifying agent in the cosmetic industry and derived directly or indirectly from petroleum. For example, oil-derived mattifying agent includes polyamide (Nylon®) powders and acrylic polymers powders, for example polymethyl methacrylate (i.e. PMMA), ethylene glycol dimethacrylate, allyl polymethacrylate, lauryl methacrylate and any co-polymer or any mixtures thereof.

The cosmetic composition may also not contain any nanoparticles. This is particularly advantageous as it improves the eco-friendly credentials of the composition. The compositions may, for example, be eco-friendly, i.e. contain mostly eco-friendly components and do not comprise any component that is harmful for the environment and/or harmful for the human health, such as nanoparticles.

The term "nanoparticles" means particles of a material of a size between 1 and 100 nm. European Cosmetic Regulation (EC) n° 1223/2009/ EC defines 'nanomaterial' as "an insoluble or biopersistant and intentionally manufactured material with one or more external dimensions, or an internal structure, on the scale from 1 to 100 nm".

The calcined kaolin may, for example, be uncoated, i.e. it has not been subjected to any coating process, for example a surface treatment process.

The calcined kaolin may not be coated by an oil-derived component such as an oil-derived mattifying agent and/or by nanoparticles. Additionally or alternatively, the calcined kaolin is not coated with a non eco-friendly component, for example chosen in the following list: a non eco-friendly inorganic component such as TiO2 or ZnO, or a non eco-friendly organic component such as for example alkylsilanes, fluorosilanes, polysiloxanes, or isopropyl titanium triisostearate.

The cosmetic compositions may for example comprise no mattifying agent different from calcined kaolin.

Alternatively, the cosmetic compositions may further comprise a mattifying agent different from calcined kaolin.

The term "mattifying agent" relates to any ingredient known as a mattifying agent in the cosmetic industry, i.e. any ingredient able to render the skin more "matt", to reduce the gloss of the skin. For example, mattifying agent includes the oil-derived mattifying agents, cellulose and silica.

The term "non-rinsed composition" relates to any composition excluding the exfoliating and cleaning compositions, like shampoo, shower gel, or toothpaste, which are intended to be rinsed right after application.

For example, the cosmetic composition may be a make-up composition or a skin care composition.

The cosmetic composition may comprise less than about 0.5 wt % of a mattifying agent different from calcined kaolin. For example the cosmetic composition may comprise equal to or less than about 0.4 wt % of a mattifying agent different from calcined kaolin, for example equal to or less than about 0.2 wt % of a mattifying agent different from calcined kaolin.

Calcined Kaolin

To form the calcined kaolin, the calcination temperature may be controlled so that the kaolin undergoes a characteristic endothermic dehydration reaction, and the original minerals (e.g. kaolinite) may be fully or partially dehydroxylated. Calcination temperature may be held significantly below that at which the metakaolin collapses, as would be indicated by a sharp exotherm in the differential thermal analysis (DTA). In contrast, fully calcined kaolin pigments may be calcined at temperatures above this exotherm.

The kaolin may, for example, undergo dehydroxylation by calcination. This is a thermal treatment process, generally in the presence of air or oxygen. Calcination changes the kaolin structure from crystalline to amorphous. The degree to which kaolin undergoes changes in crystalline form may depend on the amount of heat to which it is subjected. Generally, the higher the temperature, the shorter the calcination time. Generally, calcination is performed at temperatures ranging from about 550° C. to about 950° C. (for example from about 750° C. to about 950° C., for example from about 850° C. to about 900° C.) to produce the calcined kaolin or metakaolin. Further heating to temperatures around about 900 to 950° C. may result in further structural changes such as densification and formation of an aluminium-silicon spinel ($Si_3Al_4O_{12}$). At approximately 950° C., amorphous regions of kaolin (e.g. metakaolin) may begin to re-crystallize. Further heating to temperatures around about 1050° C. and above may result in further structural changes to form mullite $3Al_2O \cdot 2SiO_2$ and highly crystalline cristobalite $SiO_2$.

For example, any furnace, kiln or other suitable heating apparatus may be used for the calcination of the kaolin. A typical procedure involves heating kaolin in a kiln, for example a conventional rotary kiln. Typically, the kaolin may be introduced into the kiln as an extrudate from a pug mill. As the kaolin proceeds through the kiln, typically at a starting moisture content of about 25% by weight to facilitate the extrusion of the first kaolin, the extrudate breaks down into pellets as a result of the calcination process. A small amount of binder (such as alum) may be added to the kaolin) to provide "green strength" to the kaolin so as to prevent the kaolin from completely breaking down into powder form during the calcination process.

The calcination process used may, for example, be soak calcining, i.e. wherein the kaolin or clay is calcined for a period of time during which the chemistry of the material is gradually changed by the effect of heating. The calcining may for example be for a period of at least 1 minute, in many cases at least 10 minutes, e.g. from 30 minutes to five or more hours. Known devices suitable for carrying out soak calcining include high temperature ovens, rotary kilns and vertical kilns.

The calcination process may, for example, be flash calcining, wherein the hydrous kaolin is typically rapidly heated over a period of less than one second, e.g. less than 0.5 seconds. Flash calcination may, for example, introduce kaolin (e.g. water washed kaolin) to a hot gas stream for a few seconds. Flash calcination refers to heating a material at an extremely fast rate, almost instantaneously. The heating rate in a flash calciner may be of the order of 56,000° C. per second or greater, such as about 100,000° C. to about 200,000° C. per second. The kaolin may, for example, be prepared by flash calcination, wherein the clay may be exposed to a temperature greater than 500° C. for a time not more than 5 seconds. The kaolin may, for example, be calcined to a temperature in the range of from 550° C. to 1200° C.; for microsecond periods the temperature may be as high as 1500° C. The kaolin may be calcined to a temperature in the range of from 800° C. to 1100° C.; for example a temperature in the range of from 900° C. to 1050° C.; for example a temperature in the range of from 950° C. to 1000° C. The kaolin may, for example, be calcined for a time less than 5 seconds; for example for less than 1 second; for example for less than 0.5 seconds; for example for less than 0.1 seconds. Flash calcination of kaolin particles gives rise to relatively rapid blistering of the particles caused by relatively rapid dehydroxylation of the kaolin. Water vapour is generated during calcination which may expand extremely rapidly, in fact generally faster than the water vapour can diffuse through the crystal structure of the particles. The pressures generated are sufficient to produce sealed voids as the interlayer hydroxyl groups are driven off, and it is the swollen interlayer spaces, voids, or blisters between the kaolin platelets which typify flash calcined kaolins and give them characteristic properties.

The flash calcination process may be carried out by injecting the kaolin into a combustion chamber or furnace wherein a vortex may be established to rapidly remove the calcined kaolin from the combustion chamber. A suitable furnace would be one in which a toroidal fluid flow heating zone is established such as the device described in WO 99/24360 and corresponding applications U.S. Pat. Nos. 6,334,894 and 6,136,740, the contents of which are herein incorporated by reference in their entirety.

Flash calcined kaolin is a calcined kaolin obtained by a flash calcination process, for example as described above.

The kaolin may, for example, undergo one or more sizing and/or comminution steps prior to or after any optional dehydroxylation. For example, the kaolin may undergo comminution by crushing or grinding or milling. For example, the kaolin may undergo sizing using screens, centrifuges, cyclones and air classifiers. Screening can be performed using screens of a desired mesh, such as a 325 mesh screen. Other methods include gravity sedimentation or elutriation, any type of hydrocyclone apparatus, or, for example, a solid bowl decanter centrifuge, and disc nozzle centrifuge. The resultant coarse fraction may be discarded, used as a separate product or, for example, may be redirected back to the comminution tank. The kaolin may, for example, undergo densification or concentration steps, for example by gravity concentration, froth flotation and/or dewatering.

The calcined kaolin may, for example, have a $d_{50}$ ranging from about 0.1 μm to about 4.0 μm, for example from about 0.4 μm to about 3.0 μm, alternatively from about 0.8 μm to about 1.8 μm. For example, the calcined kaolin may have a $d_{50}$ ranging from about 0.9 μm to about 1.7 μm or from about 0.95 μm to about 1.6 μm or from about 1.0 μm to about 1.4 μm or from about 1.1 μm to about 1.3 μm. For example, the calcined kaolin may have a $d_{50}$ of about 1.2 μm.

The calcined kaolin may, for example, have a $d_{90}$ ranging from about 1.0 μm to about 7.0 μm. For example, the calcined kaolin may have a $d_{90}$ ranging from about 1.8 μm to about 6.0 μm or from about 2.0 μm to about 5.0 μm or from about 3.0 μm to about 4.5 pm or from about 3.2 μm to about 4.2 μm. The calcined kaolin, may, for example, have a $d_{90}$ ranging from about 3.4 μm to about 4.0 μm or from about 3.5 μm to about 3.9 μm. For example, the calcined kaolin may have a $d_{90}$ of about 3.7 μm.

The calcined kaolin may, for example, have a $d_{10}$ ranging from about 0.2 μm to about 1.0 μm. For example, the calcined kaolin may have a $d_{10}$ ranging from about 0.3 μm to about 0.9 μm or from about 0.35 μm to about 0.85 μm or from about 0.4 μm to about 0.8 μm or from about 0.4 μm to about 0.7 μm. The calcined kaolin, may, for example, have a $d_{10}$ ranging from about 0.4 μm to about 0.6 μm or from about 0.45 μm to about 0.55 μm. For example, the kaolin may have a $d_{10}$ of about 0.5 μm.

Unless otherwise stated, the particle sizes and other particle size properties referred to herein are measured in a well-known manner by sedimentation of the particulate material in a fully dispersed condition in an aqueous medium using a SediGraph III 5120 instrument as supplied by Micrometrics Corporation Norcross, Georgia, USA (telephone: +17706623620), referred to herein as a "Micromeritics Sedigraph 5120 unit" (standard method ISO 13317-3). Such a machine provides measurements and a plot of the cumulative percentage by weight of particles having a size, referred to in the art as the 'equivalent spherical diameter' (e.s.d), less than given e.s.d values. The mean particle size, or the $d_{50}$ value, is the value determined in this way of the particle e.s.d. at which there are 50% by weight of the particles which have an equivalent spherical diameter less than that $d_{50}$ value. The $d_{90}$ and $d_{10}$ are the values determined in this way of the particle e.s.d. at which there are 90% and 10% respectively by weight of the particles which have an equivalent spherical diameter less than that $d_{90}$ or $d_{10}$ value.

The calcined kaolin may, for example, have an oil absorption of at least about 60 mL/100 g. For example, the calcined kaolin may have an oil absorption of at least about 80 or at least about 90 or at least about 95 mL/100 g. For example, the calcined kaolin may have an oil absorption of about 100 mL/100 g. The calcined kaolin may, for example, have an oil absorption up to about 150 mL/100 g. For example, the calcined kaolin may have an oil absorption up to about 140 mL/100 g or up to about 130 mL/100 g or up to about 120 mL/100 g.

The oil absorption of the calcined kaolin is the quantity of oil (test with linseed) added to 4 g of mineral to obtain a stiff, smooth paste. The oil absorption value (mL/100 g) evaluates a mineral's capacity to absorb the oil and organic components (standard method ISO 787/5).

The calcined kaolin may, for example, have a water absorption of at least about 60 mL/100 g. For example, the calcined kaolin may have a water absorption of at least about 80 or at least about 90 or at least about 95 mL/100 g. For example, the calcined kaolin may have a water absorption of about 100 mL/100 g. The calcined kaolin may, for example, have a water absorption up to about 150 mL/100 g. For example, the calcined kaolin may have a water absorption up to about 140 mL/100 g or up to about 130 mL/100 g or up to about 120 mL/100 g.

The water absorption of the calcined kaolin is the volume of water added to 4 g of mineral to obtain a stiff, smooth paste. The water absorption (mL/100 g) evaluates a mineral's capacity to absorb water (standard method based on ISO 787/5).

The calcined kaolin may, for example, have a sebum absorption of at least about 60 mL/100 g. For example, the calcined kaolin may have a sebum absorption of at least about 80 or at least about 90 or at least about 95 mL/100 g. For example, the calcined kaolin may have a sebum absorption of about 100 mL/100 g. The calcined kaolin may, for example, have a sebum absorption up to about 150 mL/100 g. For example, the calcined kaolin may have a sebum absorption up to about 140 mL/100 g or up to about 130 mL/100 g or up to about 120 mL/100 g.

The sebum absorption of the calcined kaolin is the volume of synthetic sebum added to 4 g of mineral to obtain a stiff, smooth paste. The sebum absorption (mL/100 g) evaluates a mineral's capacity to absorb sebum (standard method based on 787/5).

The synthetic sebum used is a composition as in Table 1 below.

TABLE 1

| Ingredient | Wt % |
| --- | --- |
| Trioleine | 32.1 |
| Cetyl palmitate | 24.2 |
| stearic acid | 13.8 |
| oleic acid | 13.8 |
| cholesterol palmitate | 1.9 |

TABLE 1-continued

| Ingredient | Wt % |
| --- | --- |
| cholesterol palmitate | 3.9 |
| squalene | 10.3 |

The calcined kaolin may, for example, have a bulk density of at least about 150 g/l. For example, the calcined kaolin may have a bulk density of at least about 160 g/l or at least about 180 g/l or at least about 200 g/l or at least about 220 g/l or at least about 230 g/l. For example, the calcined kaolin may have a bulk density of about 240 g/l. The calcined kaolin may, for example, have a bulk density up to about 400 g/l. For example, the calcined kaolin may have a bulk density up to about 350 g/l or up to about 300 g/l or up to about 290 g/l or up to about 280 g/l or up to about 270 g/l or up to about 260 g/l or up to about 250 g/l.

The bulk density of the kaolin is measured by putting the kaolin in a container with a known volume and weighing it (standard method EN 1097/3).

The calcined kaolin may, for example, have a surface area of at least about 8 $m^2/g$. For example, the calcined kaolin may have a surface area of at least about 9 $m^2/g$ or at least about 10 $m^2/g$ or at least about 11 $m^2/g$. For example, the calcined kaolin may have a surface area of about 12 $m^2/g$. The calcined kaolin may, for example, have a surface area up to about 25 $m^2/g$. For example, the kaolin may have a surface area up to about 20 $m^2/g$ or up to about 19 $m^2/g$ or up to about 18 $m^2/g$ or up to about 17 $m^2/g$ or up to about 16 $m^2/g$ or up to about 15 $m^2/g$ or up to about 14 $m^2/g$ or up to about 13 $m^2/g$.

The surface area of the calcined kaolin may be measured by BET nitrogen absorption according to DIN ISO 9277, for example using a TrisTar machine, available from Micromeritics.

The calcined kaolin may, for example, have a specific gravity of at least about 2. For example, the calcined kaolin may have a specific gravity of at least about 2.1 or at least about 2.2 or at least about 2.3 or at least about 2.4 or at least about 2.5 or at least about 2.6 or at least about 2.7 or at least about 2.8. For example, the calcined kaolin may have a specific gravity of about 3 or up to about 3.1.

The specific gravity of the calcined kaolin is measured by calculating the mass of a dried powder divided by its volume, which is calculated using water as the displacing medium at room temperature.

The calcined kaolin may, for example, be present in the cosmetic composition in an amount ranging from about 0.1 wt % to about 40 wt %.

The cosmetic composition may, for example, be a liquid cosmetic composition. The cosmetic composition may, for example, be in the form of dispersions of gel or lotion type, emulsions of liquid or semi-liquid consistency of the milk type, obtained by dispersing an oil phase in an aqueous phase (O/W) or vice versa (W/O), or suspensions or emulsions of soft, semi-solid or solid consistency of the cream or gel type, or alternatively multiple emulsions (W/O/W or O/W/O), microemulsions, vesicular dispersions of ionic and/or non-ionic type, or wax/aqueous phase dispersions.

If the cosmetic composition is a liquid composition, the calcined kaolin may for example be present in the cosmetic composition in an amount ranging from about 0.1 wt % to about 15 wt % or from about 0.1 wt % to about 11 wt % or from about 0.1 wt % to about 9 wt % or from about 0.1 wt % to about 7 wt %. For example, the calcined kaolin may be present in the cosmetic composition in an amount ranging from about 2.5 wt % to about 15 wt % or from about 2.5 wt % to about 11 wt % or from about 2.5 wt % to about 9 wt % or from about 0.1 wt % to about 7 wt %. For example, the calcined kaolin may be present in the cosmetic composition in an amount ranging from about 3 wt % to about 15 wt % or from about 3 wt % to about 11 wt % or from about 3 wt % to about 9 wt % or from about 3 wt % to about 7 wt % or from about 3 wt % to about 6 wt %.

The cosmetic composition may, for example, be a solid cosmetic composition. The cosmetic composition may, for example, be in the form of stick or compact or free or pressed or loose powders.

If the cosmetic composition is a solid composition, the calcined kaolin may for example be present in the cosmetic composition in an amount ranging from about 0.1 wt % to about 30 wt % or from about 2.0 wt % to about 25 wt % or from about 5.0 wt % to about 20 wt % or from about 5.0 wt % to about 15 wt %. For example, the calcined kaolin may be present in the cosmetic composition in an amount ranging from about 2.5 wt % to about 30 wt % or from about 2.5 wt % to about 25 wt % or from about 2.5 wt % to about 20 wt % or from about 2.5 wt % to about 15 wt %. For example, the calcined kaolin may be present in the cosmetic composition in an amount ranging from about 3 wt % to about 30 wt % or from about 3 wt % to about 25 wt % or from about 3 wt % to about 20 wt % or from about 3 wt % to about 15 wt % or from about 3 wt % to about 10 wt %.

All these compositions are prepared according to the usual methods.

Suitable cosmetically acceptable carriers will be known to those skilled in the art and will be selected according to the intended end-use of the cosmetic composition. The cosmetically acceptable carrier may be in a variety of forms including as a solution, a colloidal dispersion, an oil-in-water emulsion, a water-in-oil emulsion, a suspension, a cream, a lotion, a gel, a powder, a foam, a mousse or a spray.

The cosmetic composition may comprise one or more standard cosmetic ingredients, such as, for example, hydrophilic or lipophilic gelling and/or thickening agents, anti-settling agents, antioxidants, fragrances, preservatives, neutralizing agents, sunscreen agents, vitamins, moisturizing agents, conditioning agents, self-tanning compounds, antiwrinkle actives, emollients, hydrophilic or lipophilic active principles, agents for combating free radicals, sequestering agents, colouring agents, pearlescent agents and film-forming agents. The cosmetic ingredients included in the cosmetic composition may be chosen according to the intended end-use of the cosmetic composition. The cosmetic ingredients may also be "cosmetically acceptable" in that they are compatible with application to any keratinous surface (e.g. skin, lips or hair) of a living being (e.g. human).

The cosmetically acceptable carrier and any standard cosmetic ingredients may, for example, make-up up to 99.9 wt % of the cosmetic composition. For example, the cosmetically acceptable carrier and standard cosmetic ingredients may make-up up to 99 wt % of the cosmetic composition or up to about 98.5 wt % or up to about 98 wt % or up to about 97.5 wt % or up to about 97 wt % of the cosmetic composition.

Uses

The use of calcined kaolin as a mattifying agent in a cosmetic composition is also disclosed herein. The cosmetic composition and calcined kaolin may, for example, be according to any of the embodiments described above, including any combination thereof.

Methods for Reducing the Gloss of the Skin

A method for reducing the gloss of the skin is also disclosed herein. The method consist in applying to the surface of the skin an effective amount of calcined kaolin according to any of the embodiments described above, including any combination thereof. The method may, for example, be a cosmetic method.

EXAMPLES

The invention is now illustrated by some non-limitative examples. In the following examples, the percentages are weight percentages.

Example 1

Gel-Cream Composition

TABLE 2

| Phase | INCI Name | Commercial name | Function | % |
|---|---|---|---|---|
| A | Aqua | — | Solvent | QSP 100 |
|  | Chlorphenesin | Elestab CPN | Preservative | 0.2 |
| B | Sodium Acrylates Copolymer | Lecigel | Gelling Agent | 1.8 |
| C | Phytic Acid | Dermofeel PA | Chelating Agent | 0.1 |
|  | Coco caprylate/caprate | DUB 810 C | Emollient | 3 |
|  | Glycerin | — | Humectant | 1 |
|  | Tocopherol | Covi-Ox 190 EU C | Antioxidant | 0.1 |
| D | Glyceryl Caprylate | Dermosoft GMCY | Emollient | 0.5 |
| E | Ingredient E | — | Mattifying Agent | 5.0 |

Phase A ingredients are weighted and heated up to the melt of the Chlorphenesin. Phase B is then sprinkled under stirring until obtaining a homogenised gel. Phase C ingredients are added one by one. Phase D is gently heated until it has melt and is then introduced into the mixture.

Finally, ingredient E is added.

Compositions comprising 5 wt % of ingredient E in a gel cream composition were made using as ingredient E either flash calcined kaolin, ImerCare® 04K, cellulose or PMMA. A composition comprising no ingredient E was also made as a control.

Example 2

Pressed Powder

TABLE 3

| Phase | INCI Name | Commercial name | Function | % |
|---|---|---|---|---|
| A | Talc | ImerCare ® Pharma 5T (Imerys) | Filler | 72.6 |
|  | Sodium Dehydroacetate | — | Preservative | 0.2 |
|  | Titanium Dioxide/Aluminium Hydroxide/Lauroyl Lysine | LL-5 TiO2 CR-50 (Daito Kasei) | Pigment | 1.3 |
|  | Black Iron Oxide/Lauroyl Lysine | LL-5 Black BL-100P (Daito Kasei) | Pigment | 0.2 |

TABLE 3-continued

| Phase | INCI Name | Commercial name | Function | % |
|---|---|---|---|---|
|  | Yellow Iron Oxide/Lauroyl Lysine | LL-5 Yellow LL-100P (Daito Kasei) | Pigment | 0.4 |
|  | Red Iron Oxide/Lauroyl Lysine | LL-5 Red E-516P (Daito Kasei) | Pigment | 0.3 |
| B | Coco Caprylate/Caprate | Dub 810C (Stearinerie Dubois) | Binder | 5.0 |
| C | Ingredient C | — | Mattifying agent | 20.0 |

Phase A ingredients are weighted and mixed by hand using a maryse until obtaining an homogeneous mixture, then in a mixer 30 sec until complete homogenization. Phase B is then added drop by drop. The mixture is then homogenized by hand mixing. Phase C ingredient is then added and the mixture is homogenized. The resulting mixture is then mixed again then sifted. 12 g are weighted in a cup and are then compacted 20 seconds under 20 bar.

Compositions comprising 20 wt % of ingredient C in a pressed powder composition were made using as ingredient C either flash calcined kaolin, ImerCare® 04K, cellulose or PMMA. A composition comprising 20 wt % talc as ingredient C (Luzenac pharma M sold by Imerys) was also made as a control.

Results

The properties of the minerals described in Examples 1 and 2 were determined as follow.

The D50 was determined using a SediGraph III 5120 instrument as supplied by Micrometrics Corporation Norcross, Georgia, USA (telephone: +17706623620), referred to herein as a "Micromeritics Sedigraph 5120 unit" (standard method ISO 13317-3).

The oil absorption, the synthetic sebum and the water absorption were determined as described before, according to standard method ISO 787/5.

TABLE 4

| Référence | Mineral | Ore | D50 sedigraph (μm) | Oil Absorption (mL/100 g) | Synthetic Sebum Absorption (mL/100 g) | Water Absorption (mL/100 g) |
|---|---|---|---|---|---|---|
| ImerCare ® 04K | Natural Kaolin | UK | 0.4 | 50 | 40 | 30 |
| — | Flash Calcined Kaolin | UK | 1.2 | 100 | 100 | 100 |

Calcined kaolin surprisingly showed a high oil, synthetic sebum and water absorption compared to natural kaolin.

Panel Test

To measure the mattifying effect, the softness and the opacity, a sensory analysis was conducted with an expert panel test of 5 people, according to ISO 13299. The panelist assessed the mattifying of 4 formulations on a scale of 0 to 5.

Test in Pressed Powder

TABLE 5

|  | Placebo (with talc) | 04K | Flash calcined kaolin | Cellulose | PMMA |
|---|---|---|---|---|---|
| Matt effect | 2.5 | 3 | 4.5 | 3 | 4 |
| Softness | 3 | 3 | 4.5 | 4 | 5 |
| Opacity | 1.5 | 2 | 3.5 | 2.5 | 1 |

Test in Gel Cream

TABLE 6

|  | Placebo (without any mattifying agent) | 04K | Flash calcined kaolin | Cellulose | PMMA |
|---|---|---|---|---|---|
| Matt effect | 0.5 | 3 | 4 | 3.5 | 4 |
| Softness | 0.5 | 2.5 | 1 | 3 | 4 |

The surprising demonstrated properties of calcined kaolin were confirmed by the panel test. A very good mattifying effect combined with a satisfying softness makes this eco-friendly an ideal product for cosmetics.

The invention claimed is:

1. A method for reducing skin gloss consisting of applying to a skin surface a composition having a cosmetically acceptable carrier and an effective amount of flash calcined kaolin, the effective amount being at least 2.5% by weight of flash calcined kaolin relative to a total weight of the composition having the cosmetically acceptable carrier; wherein the flash calcined kaolin has:

a specific surface area (BET) between 8 and 14 $m^2/g$, a sebum absorption of at least 60 mL/100 g of flash calcined kaolin, a water absorption of at least about 60 mL/100 g, and a mean particle size as determined by sedimentation ($d_{50}$) ranging from about 0.1 μm to about 4.0 μm.

2. The method of claim 1, wherein the composition does not comprise any oil-derived mattifying agent.

3. The method of claim 1, wherein the composition comprises less than 0.5 wt % of a mattifying agent different from the flash calcined kaolin.

4. The method of claim 1, wherein the effective amount of flash calcined kaolin is applied to the skin surface and improves skin matte.

* * * * *